United States Patent
Ito et al.

(10) Patent No.: US 9,962,876 B2
(45) Date of Patent: May 8, 2018

(54) RING-SHAPED INSERT MOLDED ARTICLE

(71) Applicant: NAKANISHI METAL WORKS CO., LTD., Osaka-shi (JP)

(72) Inventors: Yoshihiro Ito, Osaka (JP); Nobumasa Oka, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days. days.

(21) Appl. No.: 15/412,213

(22) Filed: Jan. 23, 2017

(65) Prior Publication Data

US 2017/0129149 A1 May 11, 2017

Related U.S. Application Data

(62) Division of application No. 14/543,083, filed on Nov. 17, 2014.

(30) Foreign Application Priority Data

Dec. 5, 2013 (JP) ................................. 2013-251941

(51) Int. Cl.
  *B29C 45/38* (2006.01)
  *B29C 45/14* (2006.01)
  (Continued)

(52) U.S. Cl.
  CPC .... *B29C 45/2708* (2013.01); *B29C 45/14418* (2013.01); *B29C 45/38* (2013.01);
  (Continued)

(58) Field of Classification Search
  CPC ................ B29C 45/2708; B29C 45/38; B29C 45/14418; B29C 45/1459;
  (Continued)

(56) References Cited

U.S. PATENT DOCUMENTS

2004/0036226 A1   2/2004   Hosoda et al.
2004/0036631 A1   2/2004   Kayao
(Continued)

FOREIGN PATENT DOCUMENTS

JP   H07-27833      1/1995
JP   2006-133018 A1   5/2006
(Continued)

OTHER PUBLICATIONS

Rosato, Injection Molding Handbook (2000), Springer Science Business Media, 3rd Edition, p. 287.

*Primary Examiner* — Jill L Heitbrink
(74) *Attorney, Agent, or Firm* — Kratz, Quintos & Hanson, LLP (57) ABSTRACT

A molded article 1 is configured such that an insert 2 is made of a steel plate and includes a cylindrical part 2A and an annular part 2B, a plastic 4 is annular in shape so as to be joined to the annular part 2B, inner diameter D1 of the plastic 4 is larger than inner diameter D2 of the annular part 2B so that no burrs at a gate mark E protrude to the inner diameter side of the molded article 1, the injection molding is conducted with a disc gate arranged on an inner peripheral surface F of the plastic 4 at a position separated from a surface of the annular part 2B, and the gate mark E resides on the inner peripheral surface F of the plastic 4 at a position separated from the surface of the annular part 2B.

4 Claims, 8 Drawing Sheets

(51) Int. Cl.
*B29C 45/27* (2006.01)
*G01D 5/12* (2006.01)
*B29K 105/00* (2006.01)
*B29K 705/00* (2006.01)

(52) U.S. Cl.
CPC .......... *G01D 5/12* (2013.01); *B29K 2105/251* (2013.01); *B29K 2705/00* (2013.01); *B29K 2905/00* (2013.01); *B29K 2995/0008* (2013.01)

(58) Field of Classification Search
CPC .... B29C 2045/0027; B29C 2045/2714; B29C 2045/2716
See application file for complete search history.

(56) References Cited

U.S. PATENT DOCUMENTS

| | | |
|---|---|---|
| 2007/0152657 A1 | 7/2007 | Yabe et al. |
| 2008/0199118 A1 | 8/2008 | Yabe et al. |
| 2009/0058403 A1 | 3/2009 | Tomioka |
| 2009/0263063 A1 | 10/2009 | Komori |

FOREIGN PATENT DOCUMENTS

| | | | |
|---|---|---|---|
| JP | 2007-3503 | * | 1/2007 |
| JP | 2011-81008 A1 | | 4/2011 |
| JP | 2012-93125 A1 | | 5/2012 |
| WO | 2010/004696 A1 | | 1/2010 |

* cited by examiner

RING-SHAPED INSERT MOLDED ARTICLE

This application is a divisional application of U.S. application Ser. No. 14/543,083, filed Nov. 17, 2014 which claims benefit to Japanese Application 2013-251941, filed Dec. 5, 2013, the entire contents of which are incorporated herein by reference in their entireties.

TECHNICAL FIELD

The present invention relates to a ring-shaped insert molded article that is manufactured by injection molding in a state where a thermoset additive is applied to a joining surface of a ring-shaped insert to a plastic.

BACKGROUND ART

As ring-shaped insert molded articles manufactured by injection molding in a state where a thermoset additive is applied to a joining surface of a ring-shaped metallic part as an insert to a plastic and then the insert and the plastic are placed in a metal mold, there have been suggested axial (axially opposed-type) magnetic encoders (for example, refer to Patent Documents 1 and 2, and Patent Document 3, FIG. 2) and radial (radial opposed-type) magnetic encoders (for example, refer to Patent Document 3, FIG. 9 and Patent Document 4), which are used in devices for detecting the rotation speed of a rotating body.

Such injection molding of magnetic encoders is performed in many cases such that a molten resin is injected into a metal mold from a disc gate placed at the radially inner side of the insert molded article for the viewpoint of the orientation of magnetic substance powder in the molten resin (refer to Patent Document 2, paragraphs [0017] to [0023], Patent Document 3, paragraph [0034], and Patent Document 4, the description in the prior art section).

CITATION LIST

Patent Literatures

Patent Document 1: JP-A No. 2012-093125
Patent Document 2: JP-A No. 2006-133018
Patent Document 3: JP-A No. 2011-081008
Patent Document 4: JP-B No. H07-27833

SUMMARY OF INVENTION

Technical Problems

In the magnetic encoders manufactured by disc gate-type insert molding as described above, an additive layer intervenes between a support member as an insert and a plastic magnet (for example, refer to Patent Document 1, paragraph [0026], Patent Document 2, paragraph [0035], and Patent Document 3, paragraph [0034]).

At manufacture of conventional magnetic encoders by disc gate-type insert molding, gate cutting is conducted in many cases at a boundary surface between the support member and the plastic magnet, as can be seen from the gate placement in the axial magnetic encoder shown in FIG. 5 of Patent Document 2 or the gate placement in the radial magnetic encoder shown in FIG. 4 of Patent Document 4.

Thus, since foreign matter such as dust generated from the cut resin may remain on the insert (for example, slinger 16 described in Patent Document 2 or rotor yoke 1 described in Patent Document 4), it is necessary to perform a post-process for removing the foreign matter. In addition, when the gate cutting is conducted on the boundary surface, a shearing load is applied to the boundary surface (joining surface between the insert and the plastic magnet) that is low in strength, which may cause degradation of adhesive performance.

In addition, if a metal mold structure with the gate position aligned to the inner peripheral surface of cylindrical part (annular part) of the ring-shaped support member is used in the axial magnetic encoder, the foreign matter does not remain on the insert but burrs at the gate mark protrudes to the inner diameter side of the molded article. This requires additional work for removing the burrs.

In view of the foregoing circumstances, an issue to be solved by the present invention is to provide a ring-shaped insert molded article manufactured by injection molding using a disc gate in a state where a thermoset adhesive is applied to a joining surface of a ring-shaped insert to a plastic and then the insert and the plastic are placed in a metal mold, wherein there is no need for the foregoing post-process or additional work after gate cutting and the adhesive performance does not deteriorate.

Solution to Problems

To solve the foregoing problems, a ring-shaped insert molded article according to the present invention is a ring-shaped insert molded article manufactured by injection molding in a state where a thermoset adhesive is applied to a joining surface of a ring-shaped insert to a plastic and then the insert and the plastic are placed in a metal mold, wherein the insert is made of a steel plate and includes a cylindrical part and an annular part extended radially outward from one end edge of the cylindrical part, the plastic is annular in shape so as to be joined to the annular part of the insert, the inner diameter of the plastic is larger than the inner diameter of the annular part so that no burrs at a gate mark protrude to the inner diameter side of the molded article, the injection molding is conducted with a disc gate arranged on an inner peripheral surface of the plastic at a position separated from a surface of the annular part, and in the gate-cut state, the gate mark resides on the inner peripheral surface of the plastic at a position separated from the surface of the annular part so that no foreign matter resulting from gate cutting sticks to the surface and no shearing load is applied by gate cutting to the joining surface to prevent degradation of adhesive performance.

According to this configuration, the inner diameter of the annular plastic is larger than the inner diameter of the annular part of the ring-shaped insert so that no burrs at the gate mark protrude to the inner diameter side of the molded article, which thus eliminates the need for additional work to remove the burrs.

In addition, in the gate-cut state, the gate mark resides on the inner peripheral surface of the plastic at a position separated from the surface of the annular part so that no foreign matter resulting from the gate cutting sticks to the surface and no shearing load is applied by gate cutting to the joining surface to prevent deterioration in adhesive performance. This eliminates the need to perform the post-process for removing the foreign matter because of absence of the foreign matter on the surface and prevents degradation of adhesive performance caused by the gate cutting.

It is preferred that the ring-shaped insert molded article is an axial magnetic encoder in which the ring-shaped insert is a support member and the plastic is a plastic magnet, the inner diameter of the plastic is 0.6 mm or more larger than the inner diameter of the annular part, and the gate mark resides at a position separated 0.1 mm or more from the surface of the annular part.

According to this configuration, in the case where the ring-shaped insert molded article is an axial magnetic encoder, it is ensured that the additional work and post-process are not needed after the gate cutting and degradation of adhesive performance caused by the gate cutting is prevented.

In addition, to solve the foregoing problems, a ring-shaped insert molded article according to the present invention is a ring-shaped insert molded article manufactured by injection molding in a state where a thermoset adhesive is applied to a joining surface of a ring-shaped insert to a plastic and then the insert and the plastic are placed in a metal mold, wherein the insert is made of a steel plate and includes a cylindrical part and an annular part extended radially inward from one end edge of the cylindrical part, the plastic is cylindrical in shape so as to be joined to an outer peripheral surface of the cylindrical part of the insert and has a curve part over the annular part, the injection molding is conducted with a disc gate arranged at a position separated from a surface of the annular part on an inner peripheral surface of the plastic, and in the gate-cut state, the gate mark resides on the inner peripheral surface of the plastic at a position separated from the surface of the annular part so that no foreign matter resulting from gate cutting sticks to the surface and no shearing load is applied by gate cutting to the joining surface to prevent degradation of adhesive performance.

According to this configuration, the inner diameter of the curve part of the cylindrical plastic is sufficiently larger than the inner diameter of the annular part of the ring-shaped insert so that no burrs at the gate mark protrude to the inner diameter side of the molded article, which thus eliminates the need for additional work to remove the burrs. In addition, in the gate-cut state, the gate mark resides on the inner peripheral surface of the plastic at the position separated from the surface of the annular part so that no foreign matter resulting from the gate cutting sticks to the surface and no shearing load is applied by gate cutting to the joining surface to prevent deterioration in adhesive performance. This eliminates the need to perform the post-process for removing the foreign matter because of absence of the foreign matter on the surface and prevents degradation of adhesive performance caused by the gate cutting.

It is preferred that the ring-shaped insert molded article is a radial magnetic encoder in which the ring-shaped insert is a support member and the plastic is a plastic magnet, and the gate mark resides at a position separated 0.1 mm or more from the surface of the annular part.

According to this configuration, in the case where the ring-shaped insert molded article is a radial magnetic encoder, it is ensured that the additional work and post-process are not needed after the gate cutting and degradation of adhesive performance caused by the gate cutting is prevented.

Advantageous Effects of Invention

According to each of the ring-shaped insert molded articles according to the present invention as described above, the ring-shaped insert molded article is manufactured by injection molding in a state where a thermoset adhesive is applied to the joining surface of the ring-shaped insert to the plastic and then the insert and the plastic are placed in a metal mold, which eliminates the need for the additional work to remove the burrs at the gate mark and the need to perform the post-process for removing the foreign matter because of absence of the foreign matter on the surface resulting from the gate cutting, and prevents degradation of adhesive performance caused by the gate cutting.

BRIEF DESCRIPTION OF DRAWINGS

FIG. 4 is an enlarged longitudinal cross-sectional view of major components, showing one example of a metal mold structure (insert core-type)

FIG. 5 is an enlarged longitudinal cross-sectional view of major components, showing one example of another metal mold structure (slide core-type)

FIG. 7 is an enlarged longitudinal cross-sectional view of major components, showing one example of a metal mold structure (insert core-type)

FIG. 8(a) shows a state in which, after mold clamping, a molten plastic is injected into the metal mold; FIG. 8(b) shows a state where the metal mold is cooled and then opened; and FIG. 8(c) shows a state where the molded article is removed from the metal mold, set on a jig, and then cut at a gate.

DESCRIPTION OF EMBODIMENTS

Embodiments of the present invention will now be described below with reference to the drawings. The present invention is not limited to the embodiments shown in the drawings but includes all of embodiments meeting the requirements described in the patent claims.

First Embodiment

Figure 1:
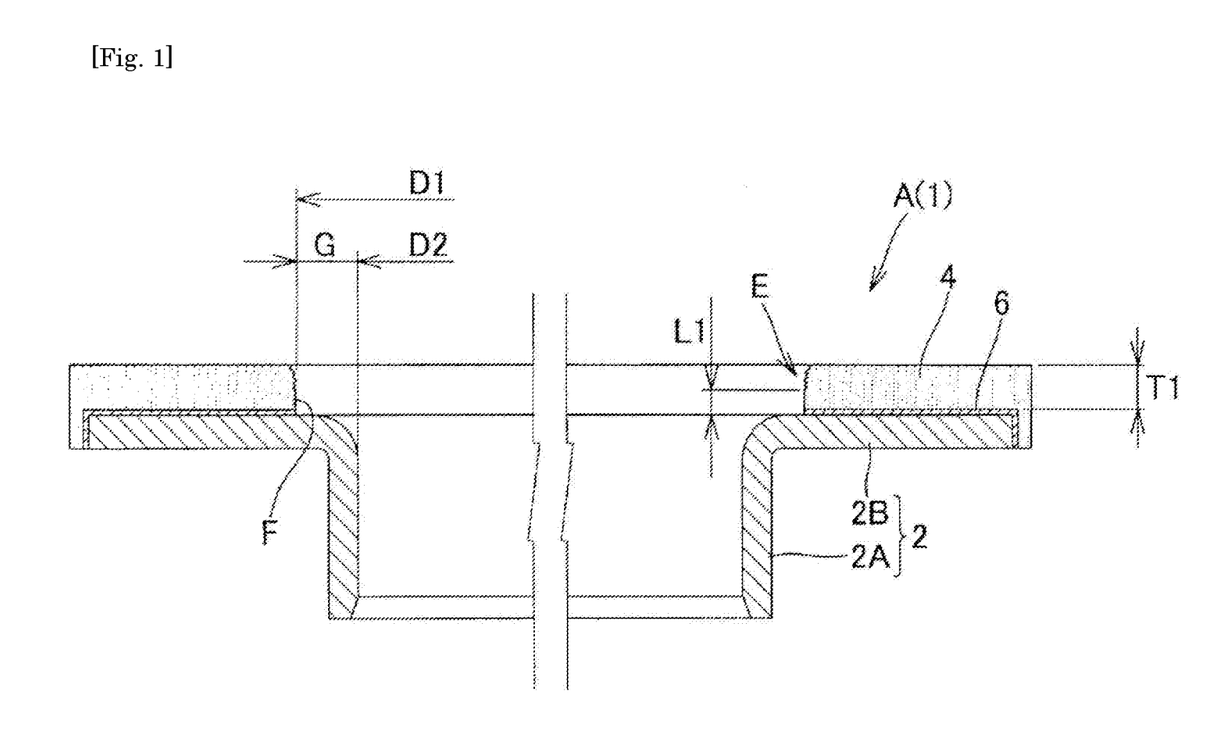
FIG. 1 is a longitudinal cross-sectional view of a ring-shaped insert molded article (axial magnetic encoder) according to a first embodiment of the present invention.

As shown in the longitudinal cross-sectional view of FIG. 1, a ring-shaped insert molded article 1 according to a first embodiment of the present invention is manufactured by injection molding in a state where a thermoset adhesive is applied to a joining surface of a ring-shaped insert 2 to a plastic 4 and then the ring-shaped insert 2 and the plastic 4 are placed in a metal mold. An adhesive layer 6 intervenes between the ring-shaped insert 2 and the plastic 4.

In addition, the ring-shaped insert molded article 1 is an axial magnetic encoder A in which the ring-shaped insert 2 is a support member and the plastic 4 is a plastic magnet.

The insert 2 is made of a steel plate and includes a cylindrical part 2A and an annular part 2B extended radially outward from one end edge of the cylindrical part 2A. The ring-shaped insert 2 is formed by pressing a stainless-steel plate of 0.6 mm thick, for example.

The shape of the ring-shaped insert 2 is not limited to that shown in FIG. 1 as far as it includes at least the cylindrical part 2A and the annular part 2B.

The plastic 4 is annular in shape so as to be joined to the annular part 2B of the ring-shaped insert 2. Inner diameter D1 of the plastic 4 is larger than an inner diameter D2 of the annular part 2B (inner diameter of the cylindrical part 2A) (D1>D2) so that no burrs at a gate mark E protrude to the inner diameter side of the molded article 1. Radial distance G between an inner peripheral surface F of the plastic 4 and an inner peripheral surface of the ring-shaped insert 2 (inner peripheral surface of the annular part 2B) is 0.3 mm or more (G≥0.3 mm). Thus, a difference between the inner diameter D1 of the plastic 4 and the inner diameter D2 of the annular part 2B is 0.6 mm or more (D1−D2≥0.6 mm) and thickness T1 of the plastic 4 is 0.9 mm, for example.

In addition, the plastic 4 is formed by injection molding such that a disc gate described later is arranged on an inner peripheral surface F at a position separated from the surface of the annular part 2B. In the gate-cut state, the gate mark E resides on the inner peripheral surface F of the plastic 4 at a position separated from the surface of the annular par 2B, and a distance L1 from the surface of the annular part 2B to the gate mark E is 0.1 mm or more (L1≥0.1 mm), so that no foreign matter resulting from gate cutting sticks to the surface and no shearing load is applied by gate cutting to the joining surface between the ring-shaped insert 2 and the plastic 4 to prevent degradation of adhesive performance as described later.

The plastic (plastic magnet) 4 is formed by a magnetic material containing magnetic substance powder, a binder, and an additive. The magnetic substance powder may be preferably magnetic powder based on ferrite such as strontium ferrite or barium ferrite, or rare-earth magnetic powder based on neodymium or samarium. The binder may be preferably a thermoplastic resin material such as polyamides (PA6, PA12, PA612, and the like) or polyphenylene sulfide (PPS). The additive may be preferably an organic additive such as carbon fiber, or an inorganic additive such as glass beads, glass fiber, talc, mica, silicon nitride (ceramic), or crystalline (non-crystalline) silica.

Next, an example of injection molding for manufacturing the ring-shaped insert molded article 1 according to the first embodiment of the present invention will be described.

Figure 2:
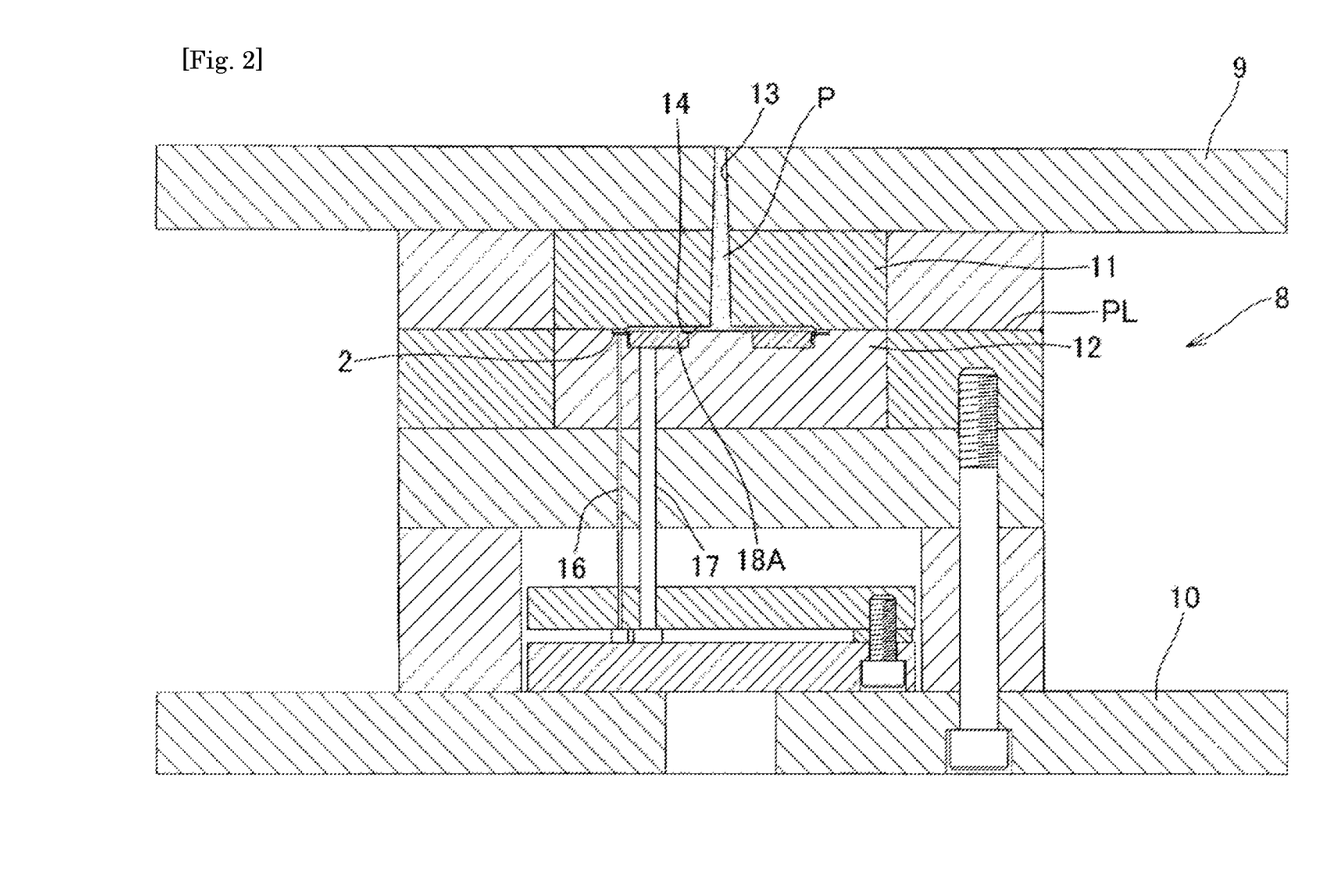
FIG. 2 is a longitudinal cross-sectional view of one example of an injection mold for manufacturing the ring-shaped insert molded article.
Figure 3:
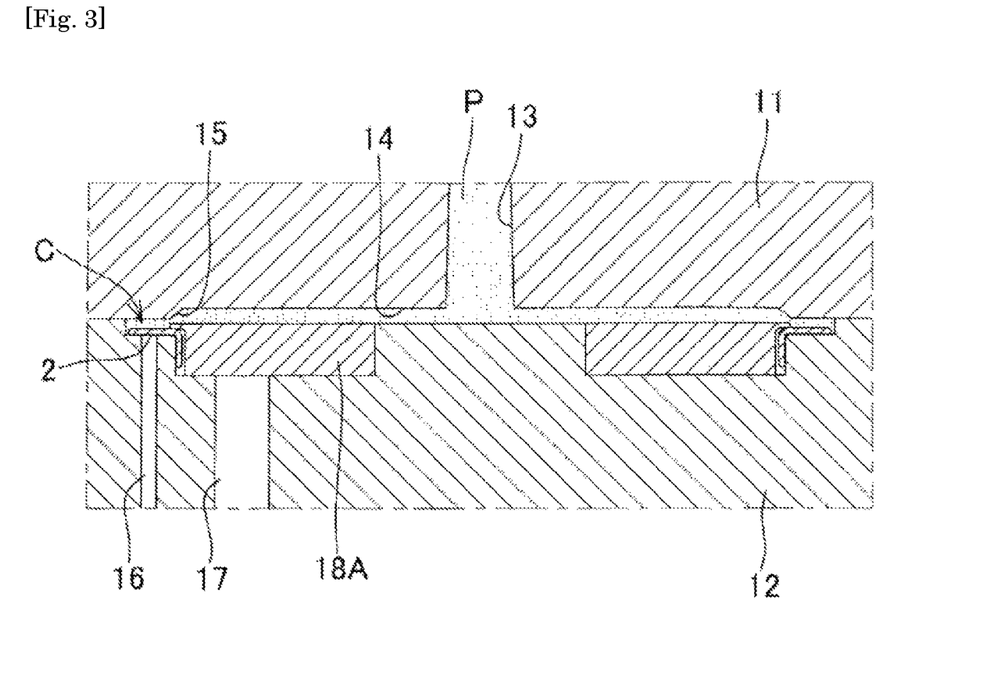
FIG. 3 is an enlarged longitudinal cross-sectional view of major components of the injection mold.

As shown in the longitudinal cross-sectional view of FIG. 2 and the enlarged longitudinal cross-sectional view of major components of FIG. 3, an injection mold 8 is intended to mold the ring-shaped insert molded article 1 (axial magnetic encoder A) and is attached to an injection molding machine by fixing a fixed attachment plate 9 to a fixed platen with a bolt and fixing a movable attachment plate 10 to a movable disc with a bolt.

Figure 4A:
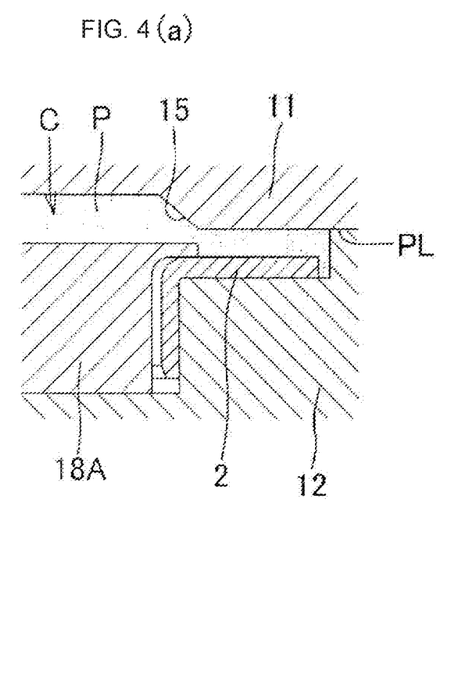
FIG. 4(a) shows a state in which, after mold clamping, a molten plastic is injected into the metal mold.

In a state where a thermoset adhesive is applied to the joining surface of the ring-shaped insert 2 to the plastic 4 and then the ring-shaped insert 2 and the plastic 4 are placed in a fixed mold plate 11 and a movable mold plate 12 and then the mold plates are clamped, when a molten plastic P is poured into a sprue 13, the molten plastic P flows through a disc gate 15 via a runner 14 and is filled into a cavity C between the fixed mold plate 11 and the movable mold plate 12 (refer also to the enlarged longitudinal cross-sectional view of major components of FIG. 4(*a*)).

The direction of extension of the sprue 13 (in which the molten plastic P is poured) is horizontal.

Figure 4B:
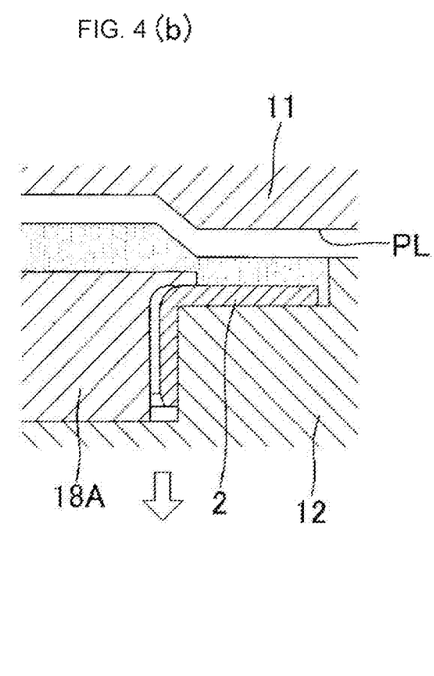
FIG. 4(b) shows a state where the metal mold is cooled and then opened.

After the molten plastic P is cooled and hardened, as shown in the enlarged longitudinal cross-sectional view of major components of FIG. 4(*b*), the movable mold plate 12 is opened from a parting line PL and a pre-gate cutting molded article and an insert core 18A are projected and ejected by ejectors 16 and 17 (refer to FIGS. 2 and 3), thereby obtaining the pre-gate cutting molded article and the insert core 18A.

Figure 4C:
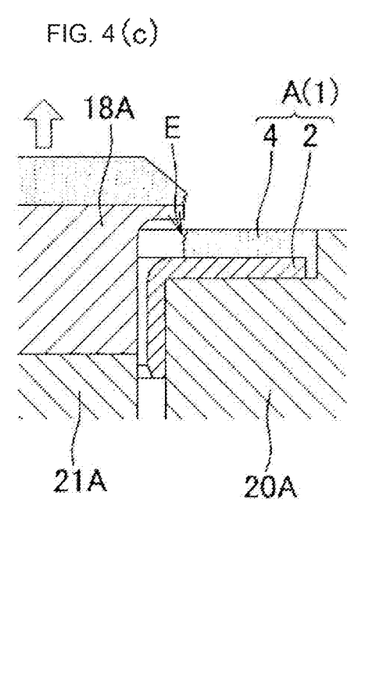
FIG. 4(c) shows a state where the molded article is removed from the metal mold, set on a jig, and then cut at a gate.

Next, as shown in the enlarged longitudinal cross-sectional view of major components of FIG. 4(*c*), while the pre-gate cutting molded article and the insert core 18A removed from the metal mold are set on a jig 20A, the molded article is pressurized by a pusher 21A to cut the gate. Thus, the gate mark E remains on the ring-shaped insert molded article 1 (axial magnetic encoder A).

At the gate cutting as shown in FIG. 4(*c*), the insert core 18A is placed along the gate cutting part of the plastic such that the insert core 18A serves as a cutting blade to cut the gate by shearing action. This reduces load on the product at the time of gate cutting.

Next, an example of a metal mold structure different from the insert core type as shown in FIG. 4 will be described.

The enlarged longitudinal cross-sectional view of major components of FIG. 5 shows a slide core-type metal mold structure.

Figure 5A:
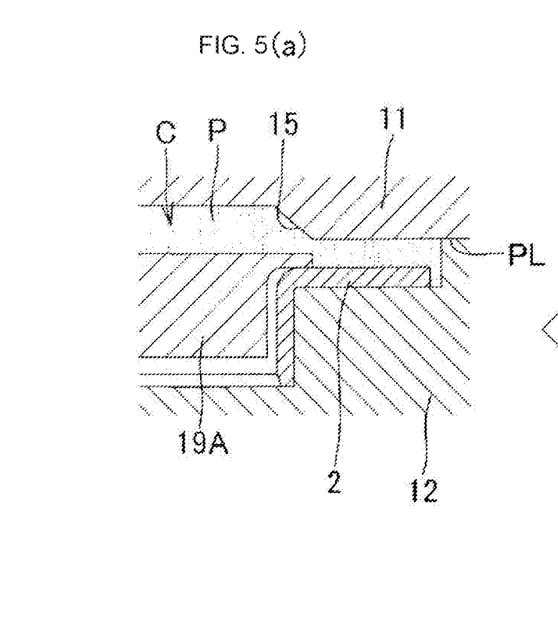
FIG. 5(a) shows a state in which, after mold clamping, a molten plastic is injected into the metal mold.
Figure 5B:
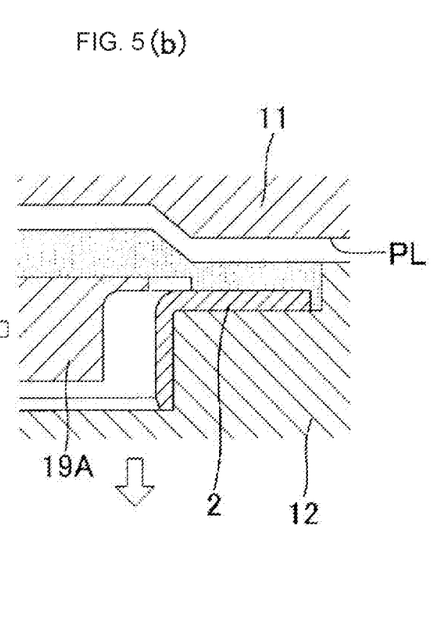
FIG. 5(b) shows a state where the metal mold is cooled and then opened.

After the molten plastic P is filled into the cavity C and then is cooled and hardened as shown in FIG. 5(*a*), a slide core 19A is slid radially inward and separated from the molded article as shown in FIG. 5(*b*). In this state, the movable mold plate 12 is opened from the parting line PL and a pre-gate cutting molded article is projected and ejected by the ejector 16 (refer to FIG. 2). Thus, the pre-gate cutting molded article is obtained.

Figure 5C:
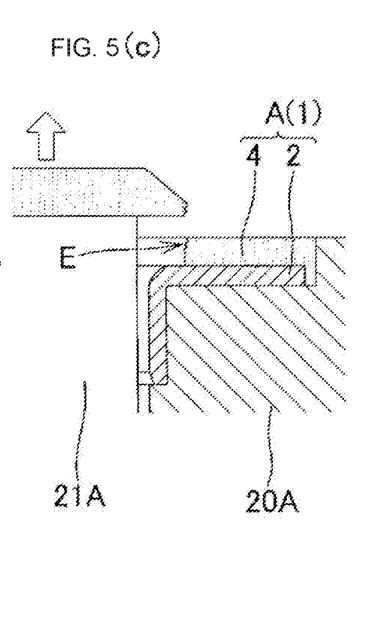
FIG. 5(c) shows a state where the molded article is removed from the metal mold, set on a jig, and then cut at a gate.

Next, as shown in FIG. 5(*c*), while the pre-gate cutting molded article removed from the metal mold is set on the jig 20A, the molded article is pressurized by the pusher 21A to cut the gate. The gate mark E remains on the ring-shaped insert molded article 1 (axial magnetic encoder A).

According to the configuration of the ring-shaped insert molded article 1 (axial magnetic encoder A) in the first embodiment, the inner diameter D1 of the annular plastic 4 is larger than the inner diameter D2 of the annular part 2B of the ring-shaped insert 2 so that no burrs at the gate mark E protrude to the inner diameter side of the molded article 1, which thus eliminates the need for additional work to remove the burrs.

In addition, in the gate-cut state, the gate mark E resides on the inner peripheral surface F of the plastic 4 at a position separated from the surface of the annular part 2B so that no foreign matter resulting from the gate cutting sticks to the surface and no shearing load is applied by gate cutting to the joining surface between the ring-shaped insert 2 and the plastic 4 to prevent deterioration in adhesive performance. This eliminates the need to perform a post-process for removing the foreign matter because of absence of the foreign matter on the surface and prevents degradation of adhesive performance caused by the gate cutting.

In addition, in the case where the ring-shaped insert molded article 1 is an axial magnetic encoder A in which the ring-shaped insert 2 is a support member, the plastic 4 is a plastic magnet, the inner diameter D1 of the plastic 4 is 0.6 mm or more larger than the inner diameter D2 of the annular part 2B, and the gate mark E resides at a position separated 0.1 mm or more from the surface of the annular part 2B, and further in the case where the ring-shaped insert molded article 1 is an axial magnetic encoder A, it is ensured that the additional work and post-process are not needed after the gate cutting and degradation of adhesive performance caused by the gate cutting is prevented.

Second Embodiment

Figure 6:
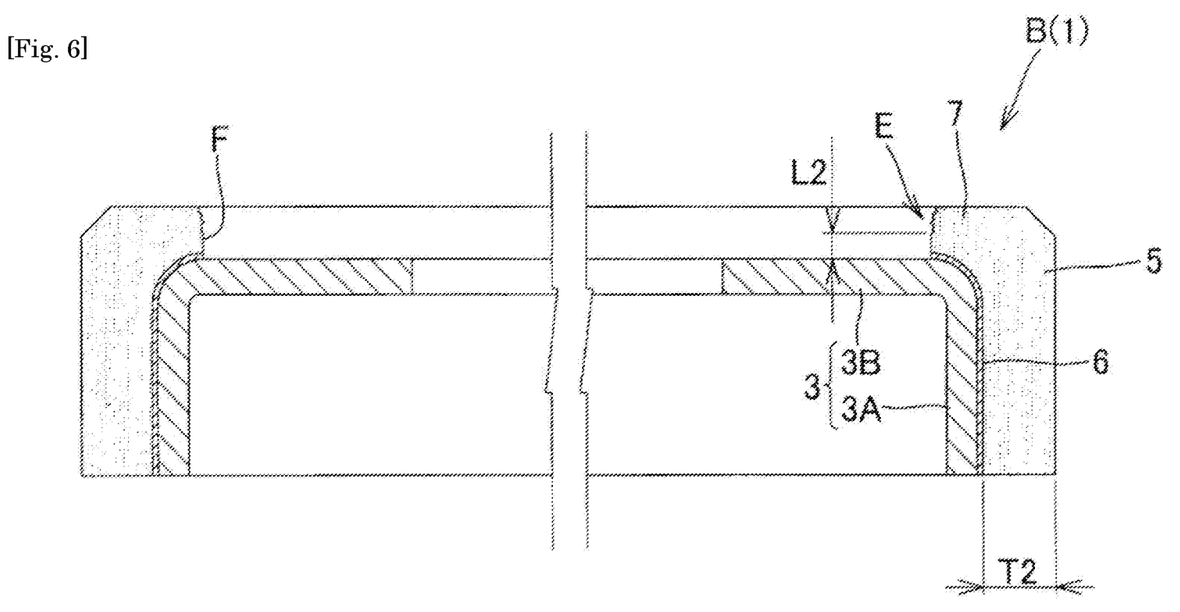
FIG. 6 is a longitudinal cross-sectional view of a ring-shaped insert molded article (radial magnetic encoder) according to a second embodiment of the present invention.

As shown in the longitudinal cross-sectional view of FIG. 6, the ring-shaped insert molded article 1 according to a second embodiment of the present invention is manufactured by injection molding in a state where a thermoset adhesive is applied to a joining surface of a ring-shaped insert 3 to a plastic 5 and then the ring-shaped insert 3 and the plastic 5 are placed in a metal mold, and the adhesive layer 6 intervenes between the ring-shaped insert 3 and the plastic 5.

In addition, the ring-shaped insert molded article 1 is a radial magnetic encoder B in which the ring-shaped insert 3 is a support member and the plastic 5 is a plastic magnet.

The ring-shaped insert 3 is made of a steel plate and includes a cylindrical part 3A and an annular part 3B extended radially inward from one end edge of the cylindrical part 3A. The ring-shaped insert 3 is formed by pressing a stainless-steel plate of 0.6 mm thick, for example.

The shape of the ring-shaped insert 3 is not limited to that shown in FIG. 6 as far as it includes at least the cylindrical part 3A and the annular part 3B.

The material for the plastic (plastic magnet) 5 is the same as that in the first embodiment. The plastic 5 is cylindrical in shape so as to be joined to the outer peripheral surface of the cylindrical part 3A of the ring-shaped insert 3, and has a curve part 7 over the annular part 3B. Thickness T2 of the plastic 5 is 0.9 mm, for example.

In addition, the plastic 5 is injection-molded such that a disc gate is arranged on the inner peripheral surface F at a position separated from the surface of the annular part 3B. In the gate-cut state, the gate mark E resides on the inner peripheral surface F of the plastic 5 at a position separated from the surface of the annular part 3B, and a distance L2 from the surface of the annular part 3B to the gate mark E is 0.1 mm or more (L2 ≥0.1 mm), so that no foreign matter resulting from gate cutting sticks to the surface and no shearing load is applied by gate cutting to the joining surface between the ring-shaped insert 3 and the plastic 5 to prevent degradation of adhesive performance as described later.

Next, an example of injection molding for manufacturing the ring-shaped insert molded article 1 according to the second embodiment of the present invention will be described.

Figure 7A:
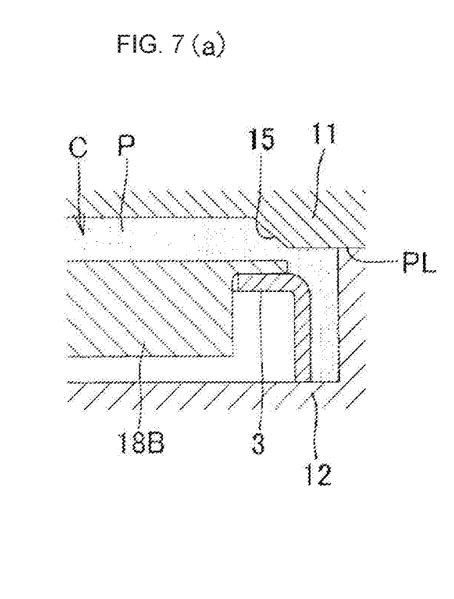
FIG. 7(a) shows a state in which, after mold clamping, a molten plastic is injected into the metal mold.
Figure 7B:
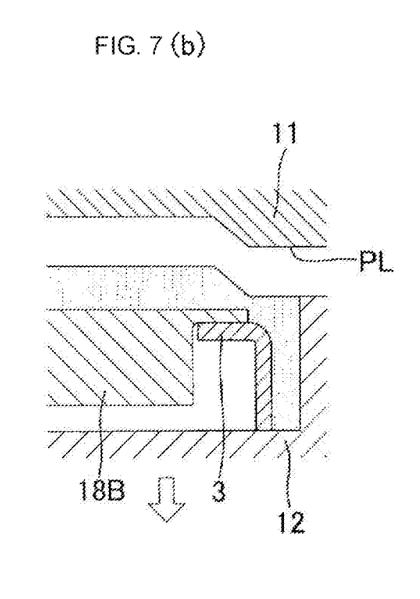
FIG. 7(b) shows a state where the metal mold is cooled and then opened.

The ring-shaped insert molded article 1 (radial magnetic encoder B) can be manufactured using the same metal mold as the injection mold 8 shown in FIG. 2. After the molten plastic P is filled into the cavity C and then is cooled and hardened as shown in the enlarged longitudinal cross-sectional view of major components of FIG. 7(a), the movable mold plate 12 is opened from the parting line PL and a pre-gate cutting molded article and an insert core 18B are projected and ejected by the ejectors 16 and 17 (refer to FIG. 2), thereby obtaining the pre-gate cutting molded article and the insert core 18B as shown in the enlarged longitudinal cross-sectional view of major components of FIG. 7(b).

Figure 7C:
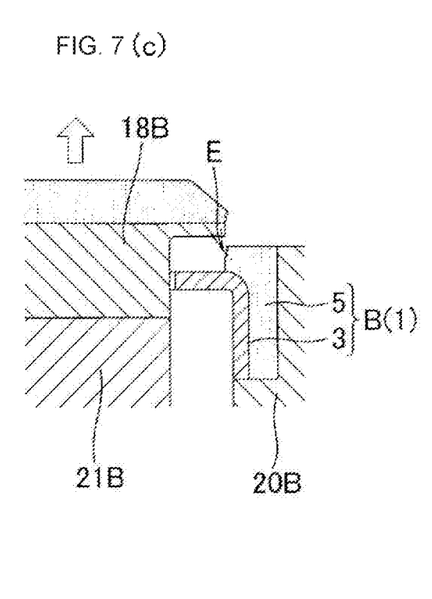
FIG. 7(c) shows a state where the molded article is removed from the metal mold, set on a jig, and then cut at a gate.

Next, as shown in the enlarged longitudinal cross-sectional view of major components of FIG. 7(c), while the pre-gate cutting molded article and the insert core 18B removed from the metal mold are set on a jig 20B, the molded article is pressurized by a pusher 21B to cut the gate. The gate mark E remains on the ring-shaped insert molded article 1 (radial magnetic encoder B).

At the gate cutting as shown in FIG. 7(c), the insert core 18B is placed along the gate cutting part of the plastic such that the insert core 18B serves as a cutting blade to cut the gate by shearing action. This reduces load on the product at the time of gate cutting.

Next, an example of a metal mold structure different from the insert core type shown in FIG. 7 will be described.

Figure 8:
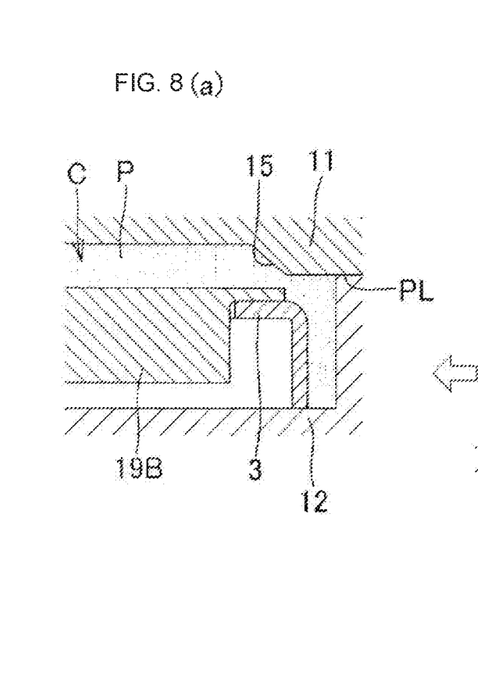
FIG. 8 is an enlarged longitudinal cross-sectional view of major components, showing one example of another metal mold structure (slide core-type)

The enlarged longitudinal cross-sectional view of major components of FIG. 8 shows a slide core-type metal mold structure.

After the molten plastic P is filled into the cavity C and then is cooled and hardened as shown in FIG. 8(a), a slide core 19B is slid radially inward and separated from the molded article as shown in FIG. 8(b). In this state, the movable mold plate 12 is opened from the parting line PL and a pre-gate cutting molded article is projected and ejected by the ejector 16 (refer to FIG. 2). Thus, the pre-gate cutting molded article is obtained.

Next, as shown in FIG. 8(c), while the pre-gate cutting molded article removed from the metal mold is set on the jig 20B, the molded article is pressurized by the pusher 21B to cut the gate. The gate mark E remains on the ring-shaped insert molded article 1 (radial magnetic encoder B).

According to the configuration of the ring-shaped insert molded article 1 (radial magnetic encoder B) in the second embodiment, the inner diameter of the curve part 7 of the cylindrical plastic 5 is sufficiently larger than the inner diameter of the annular part 3B of the ring-shaped insert 3, and thus no burrs at the gate mark E protrude to the inner diameter side of the molded article 1, which thus eliminates the need for additional work to remove the burrs.

In addition, in the gate-cut state, the gate mark E resides on the inner peripheral surface F of the plastic 5 at a position separated from the surface of the annular part 3B so that no foreign matter resulting from the gate cutting sticks to the surface and no shearing load is applied by gate cutting to the joining surface between the ring-shaped insert 3 and the plastic 5 to prevent deterioration in adhesive performance. This eliminates the need to perform a post-process for removing the foreign matter because of absence of the foreign matter on the surface and prevents degradation of adhesive performance caused by the gate cutting.

In addition, in the case where the ring-shaped insert molded article 1 is a radial magnetic encoder B in which the ring-shaped insert 3 is a support member, the plastic 5 is a plastic magnet, and the gate mark E resides at a position separated 0.1 mm or more from the surface of the annular part 3B, and further in the case where the ring-shaped insert molded article 1 is a radial magnetic encoder B, it is ensured that the additional work and post-process are not needed after the gate cutting and degradation of adhesive performance caused by the gate cutting is prevented.

In the foregoing descriptions, the ring-shaped insert molded article is an axial magnetic encoder or a radial magnetic encoder. However, the ring-shaped insert molded article of the present invention is not limited to them but can be manufactured in any manner by injection molding in the state where a thermoset adhesive is applied to the joining surface of the ring-shaped insert to the plastic and then the insert and the plastic are placed in the metal mold, such as an insert molded article with replacement of a ring-shaped metal.

In addition, the ring-shaped molded article of the present invention is configured such that, in the gate-cut state, the gate mark resides on the inner peripheral surface of the plastic at a position separated from the surface of the annular part so that no foreign matter resulting from the gate cutting sticks to the surface and no shearing load is applied by gate cutting to the joining surface between the insert and the plastic to prevent deterioration in adhesive performance. This eliminates the need to perform the post-process for removing the foreign matter because of absence of the foreign matter on the surface and prevents degradation of adhesive performance caused by the gate cutting. Besides, no burrs at the gate mark protrude to the inner diameter side of the molded article, which thus eliminates the need for additional work to remove the burrs. However, the process for removing the burrs may be performed on the ring-shaped insert molded article, depending on the specifications for the ring-shaped insert molded article.

REFERENCE SIGNS LIST

A Axial magnetic encoder
B Radial magnetic encoder
C Cavity
D1 Inner diameter of plastic
D2 Inner diameter of annular part
E Gate mark
F Inner peripheral surface of plastic
G Radial distance between inner peripheral surface of plastic and inner peripheral surface of insert
L1, L2 Distance from surface of annular part to gate mark
P Molten plastic
PL Parting line
T1, T2 Thickness
1 Ring-shaped insert molded article
2, 3 Ring-shaped insert
2A, 3A Cylindrical part
2B, 3B Annular part
4, 5 Plastic
6 Adhesive layer
7 Curve part
8 Injection mold
9 Fixed attachment plate
10 Movable attachment plate
11 Fixed mold plate
12 Movable mold plate
13 Sprue
14 Runner
15 Disc gate
16, 17 Ejector
18A, 18B Insert core
19A, 19B Slide core
20A, 20B Jig
21A, 21B Pusher

The invention claimed is:

1. A method of producing a ring-shaped insert molded article,
wherein the article includes a ring-shaped insert made of a steel plate,
the insert has a cylindrical part and an annular part extended radially inward from one end edge of the cylindrical part, and
a plastic cylindrical in shape is joined via a thermoset adhesive to the cylindrical part of the insert, in a manner to extend from the cylindrical part to the annular part with forming a curve,
the method comprising the steps of;
applying a thermoset adhesive to the joining surface of the ring-shaped insert to the plastic, placing the ring-shaped insert to the plastic in an injection mold, clamping the injection mold, and filling the molten plastic from a disc gate separated from a surface of the annular part with an insert core into a cavity of the injection mold so as to conduct an injection molding,
cooling and hardening the molten plastic and removing the pre-gate cutting molded article and the insert core from the metal mold, and
pressurizing the molded article by a pusher to cut the gate while the pre-gate cutting molded article and the insert core removed from the metal mold are set on a jig,
wherein the gate mark resides on the inner peripheral surface of the plastic at a position separated from the surface of the annular part in the gate-cut state.

2. A method of producing a ring-shaped insert molded article,
wherein the article includes a ring-shaped insert made of a steel plate,
the insert has a cylindrical part and an annular part extended radially inward from one end edge of the cylindrical part, and
a plastic cylindrical in shape is joined via a thermoset adhesive to the cylindrical part of the insert, in a manner to extend from the cylindrical part to the annular part with forming a curve,
the method comprising the steps of;
applying a thermoset adhesive to the joining surface of the ring-shaped insert to the plastic, placing the ring-shaped insert to the plastic in an injection mold, clamping the injection mold, and filling the molten plastic from a disc gate separated from a surface of the annular part with a slide core into a cavity of the injection mold so as to conduct an injection molding,
cooling and hardening the molten plastic and removing the pre-gate cutting molded article from the metal mold, and
pressurizing the molded article by a pusher to cut the gate while the pre-gate cutting molded article removed from the metal mold are set on a jig,
wherein the gate mark resides on the inner peripheral surface of the plastic at a position separated from the surface of the annular part in the gate-cut state.

3. The method of producing a ring-shaped insert molded article according to claim 1, wherein
the ring-shaped insert molded article is a radial magnetic encoder in which the ring-shaped insert is a support member and the plastic is a plastic magnet, and
the gate mark resides at a position separated 0.1 mm or more from the surface of the annular part.

4. The method of producing a ring-shaped insert molded article according to claim 2, wherein
the ring-shaped insert molded article is a radial magnetic encoder in which the ring-shaped insert is a support member and the plastic is a plastic magnet, and
the gate mark resides at a position separated 0.1 mm or more from the surface of the annular part.

* * * * *